Oct. 26, 1965  W. CARLS  3,213,883
TWO-PIECE MULTIPLE VALVE MANIFOLD
Filed Sept. 13, 1962  3 Sheets-Sheet 1
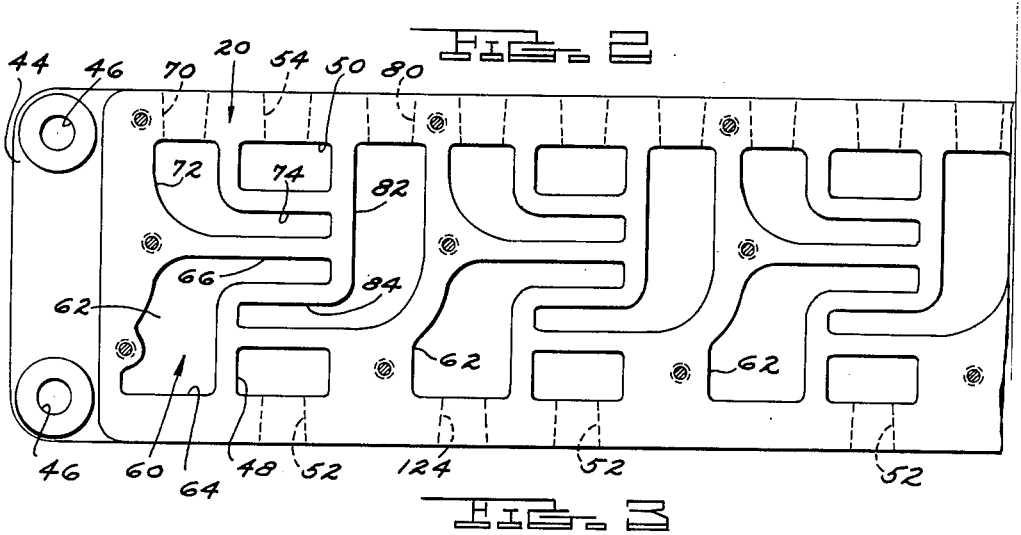
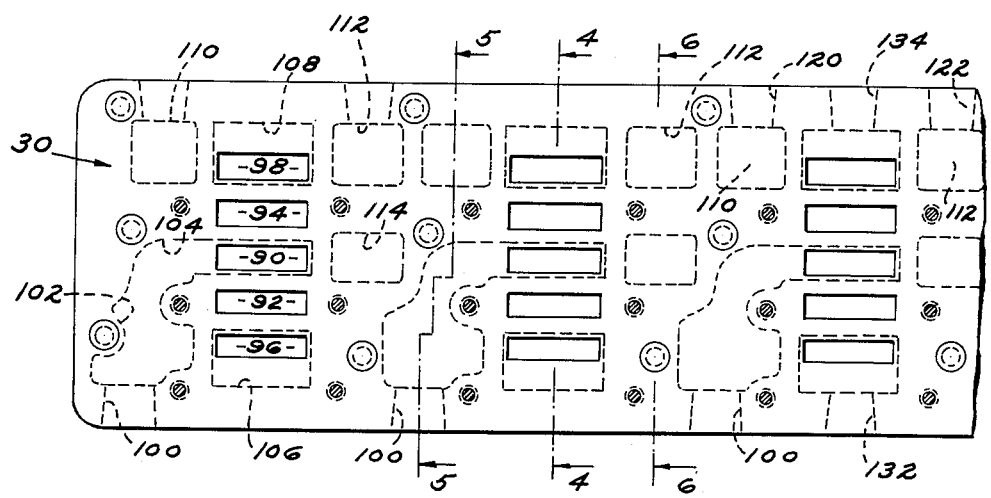
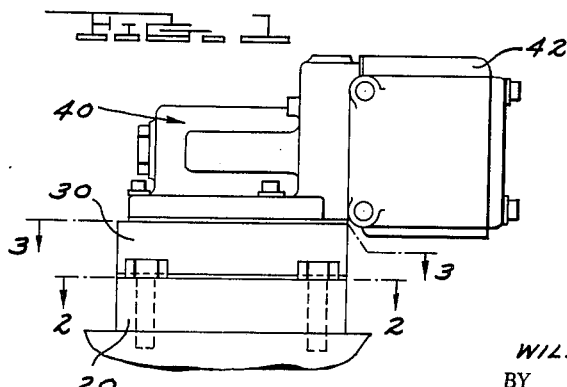
INVENTOR.
WILLIAM CARLS
BY
Barnes, Kisselle, Raisch
& Choate
ATTORNEYS

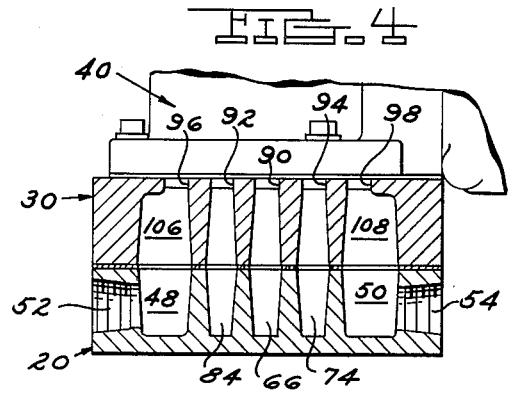
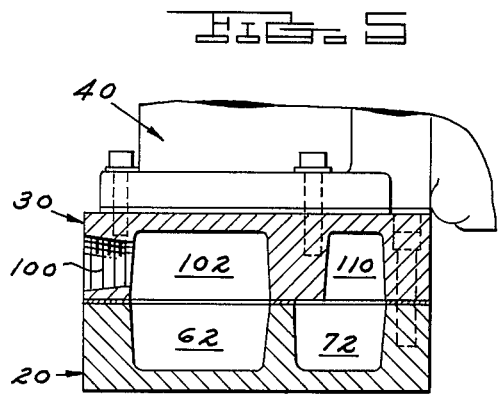
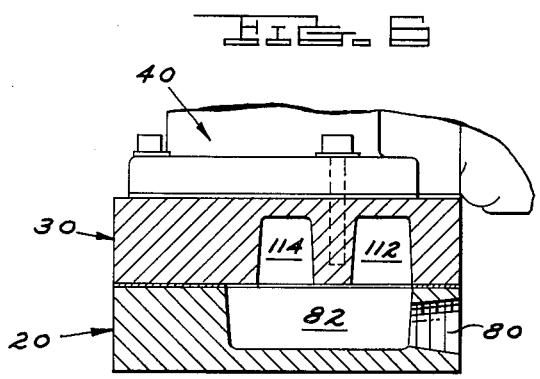

Oct. 26, 1965 W. CARLS 3,213,883
TWO-PIECE MULTIPLE VALVE MANIFOLD
Filed Sept. 13, 1962 3 Sheets-Sheet 3
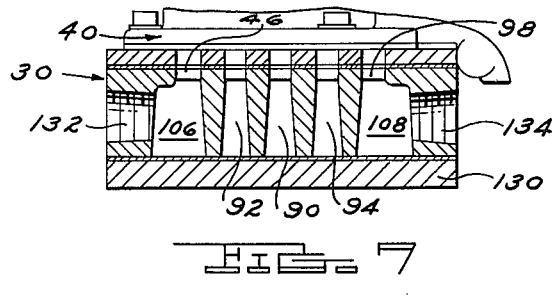
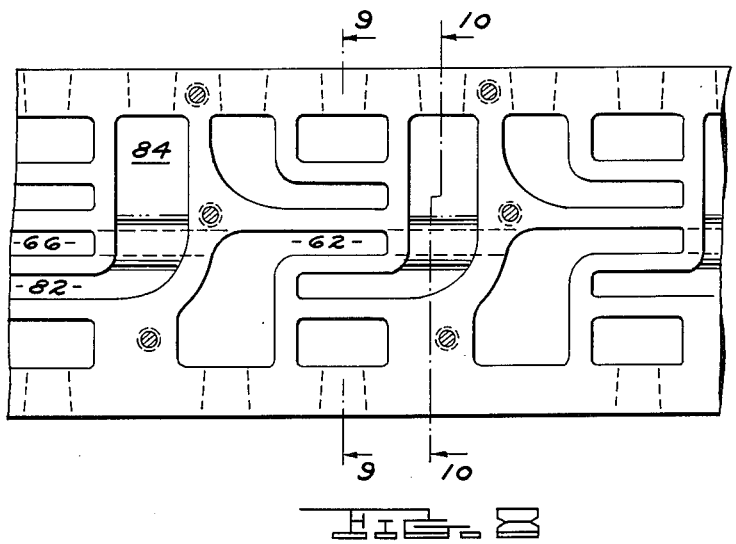
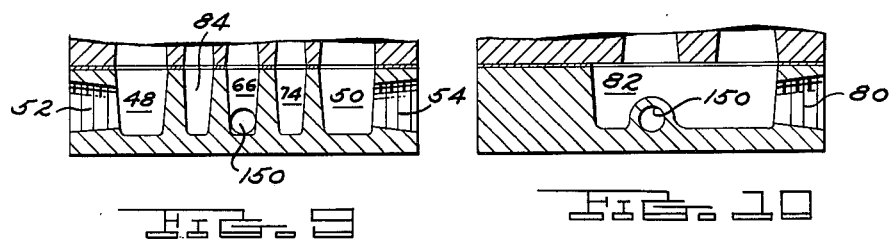
INVENTOR.
WILLIAM CARLS
BY
Barnes, Kisselle, Raisch & Choate
ATTORNEYS

United States Patent Office 3,213,883
Patented Oct. 26, 1965

3,213,883
TWO-PIECE MULTIPLE VALVE MANIFOLD
William Carls, Highland, Mich.
Filed Sept. 13, 1962, Ser. No. 223,322
1 Claim. (Cl. 137—608)

This invention relates to a valve manifold and has particularly to do with improvements in a two-piece manifold for mounting valves in a bank, said valves being primarily used for the control of operating parts of a machine. The manifold is so designed that it can be used as a two-part manifold either with individual air supply for each valve or a common air supply.

It is also designed in such a way that one part of the manifold can be used directly over a solid plate such as a surface of the machine with suitable porting to operate directly on the machine in this manner. The double manifold plate may be so mounted that the pipe fastenings to the cylinders are primarily joined to the lower section permitting the upper section to be removable from the permanent supply line connection.

Another object of the invention is the provision of a double manifold wherein porting is optional in the various plates to increase the versatility of the device and wherein a separate pressure supply for each valve station or a common pressure supply is possible in one of the plates.

The improvement lies in the arrangement of ports to be described in detail wherein each manifold plate can be open-cored from one face to facilitate the manufacture of the device, the face openings on each part mating to provide the necessary channels to supply air under pressure to the valve and direct it to one of two ends of a cylinder with suitable exhaust from the other end.

Other objects and features of the invention relating to details of construction and operation will be apparent in the following description and claim.

Drawings accompany the disclosure and the various views thereof may be briefly described as:

FIGURE 1, an end elevation of an assembled manifold showing a valve in position thereon.

FIGURE 2, a plan view of the base element of the manifold assembly.

FIGURE 3, a plan view of the top element of the manifold assembly.

FIGURES 4, 5 and 6, sectional views respectively of the double unit taken at lines 4—4, 5—5 and 6—6 of FIGURE 3.

FIGURE 7, an illustration of a modified construction wherein the top element of the manifold is utilized with a solid base.

FIGURE 8, a plan view of a modified base unit wherein a common pressure supply for all valves is utilized.

FIGURES 9 and 10, sectional views respectively on lines 9—9 and 10—10 of FIGURE 8.

Referring to the drawings:

In FIGURE 1 a valve manifold assembly is shown, the view being an end elevation showing a base plate 20 of the manifold, a top plate 30 of the manifold and a valve housing 40 fastened to the top element having a solenoid housing 42 extending beyond the manifold area.

In FIGURE 2, the base plate 20 is shown in top elevation, the porting being visible. This unit is preferably an aluminum casting having an end extension flange 44 with suitable holes 46 for mounting the base element. Each valve station has two rectangular exhaust passages 48 and 50 on each edge of the plate 20 with a suitable side port 52 and 54. Each valve station has an L-shaped pressure port 60, one leg 62 extending up to a wall 64 adjacent the bottom edge of the manifold assembly, as shown in FIGURE 2, and the other leg 66 underlying the valve mount between the two exhaust ports 48 and 50. On the top edge of a manifold base plate as viewed in FIGURE 2, there are two cylinder ports 70 and 80. The port 70 connects to one leg 72 of an L-shaped passage having another leg 74 extending to a position between the central pressure passage 66 and the exhaust passage 50. The cylinder port 80 connects to an L-shaped passage having a leg 82 leading to another leg 84 which is interposed between the central pressure passage 66 and the exhaust passage 48. Thus, three L-shaped passages have adjacent parallel legs spaced between exhaust ports, two terminating at cylinder ports at one edge of the manifold, and the third terminating at the opposite edge. The passages described are duplicated throughout the length of the manifold for any number of valve stations that are desired.

The top plate 30 of the manifold assembly is shown in plan in FIGURE 3, and the cast ports in the lower surface thereof are shown in dotted lines. For example, at the first valve station on the left-hand end of the manifold, there is a center pressure port 90 in the top face of the plate 30. On each side of the center port is a cylinder port 92 and 94 and on the outside of the cylinder ports are exhaust ports 96 and 98. An edge port 100 connects to an L-shaped passage 102 overlying passage 62–66 in the bottom plate having one leg leading inwardly to about the center of the plate 30 and then extending lengthwise (at 104) of the plate to underlie the port 90. Exhaust ports 96 and 98 have cored passages 106 and 108 in the bottom face of the plate 30 to register with the passages 48 and 50 of plate 20. Directly adjacent the exhaust passage 108 is a rectangular passage 110 which will overlie the passage 72 of the bottom plate 20. The cored passages shown at 112 and 114 are for purposes of eliminating unnecessary metal although the passage 112 can be used as an optional port on the outside wall if desired.

Thus, it will be seen, as shown in FIGURE 2, that along one edge of the bottom plate 20 the cylinder pipes can all be connected at the respective ports 70 and 80. Along the one edge of the top manifold plate 30 the pressure ports are disposed. As pointed out, cylinder ports could be placed in the top plate leading into passages 110 and 112 as shown respectively 120 and 122 in FIGURE 3.

It will be seen that the three L-shaped passages each have parallel legs 66, 74 and 84 lying between the two exhaust passages 48 and 50 and, due to the arrangement in the double manifold plates, each passage is accessible from the edge of either manifold plate as illustrated by the optional ports 120 and 122 and a possible optional port 124 which could lead through the edge of the plate 20 to the pressure passage 62.

In FIGURE 7, a modified construction is shown wherein the top plate 30 alone is shown mounted on a solid plate 130. This presents a sectional view similar to that shown of plate 30 in FIGURE 4 except that optional ports 132 and 134 are provided to connect either passages 106 and 108 respectively for optional exhaust ports. Similarly, in this case the optional cylinder ports 120 and 122 would be used at each valve station.

In FIGURES 8, 9 and 10, another modification is shown wherein a common pressure port can be used to fed the passages 66 in the lower manifold plate, thus eliminating the need for an individual pressure port for each valve station. With this arrangement, each passage 66 is connected by a central longitudinal passage 150 which tunnels the pressure through the L-shaped passage 82–84 in each case, as shown in FIGURE 10. Thus, a single port connection at the end of the manifold will supply pressure to the entire valve bank.

It will thus be seen that there is provided a valve manifold which is versatile in the sense that it can either be a one or two-piece job, thus opening up the possibility of optional wall ports for pressure and the cylinders and which also can be adapted for a common pressure source for multiple valves as well as a separate pressure source for each valve, thus increasing the flexibility of the control unit. Where it is possible to mount the top plate on a back-up plate or wall, it can serve as the manifold in itself although with this arrangement a separate pressure entry for each valve station would be required.

I claim:

For use in a multiple bank valve assembly, a manifold mounting assembly comprising, (a) a first flat elongate manifold mount block having valve mount stations on one flat surface thereof and at each station surface ports which connect with cored surface passages in a surface obverse to said one flat surface, each of said surface passages in the obverse surface having a portion terminating adjacent one of two parallel outer edges of said block, (b) a second flat elongate manifold block to register face to face in sealed relation with said first block having in one face cored surface passages each terminating at one end inwardly of the edges of said block in an aligned series of ports and each terminating at ports outwardly at one of two parallel longitudinal outer edges of said second block, said blocks when assembled in registry having respective core passages in registry whereby each of said ports in said aligned series of ports is connected through registering passages respectively to said surface ports of said first block and to ports in the edges of said second block and alternately and selectively to ports in the longitudinal edges of said first block, (c) said aligned series of ports providing a pressure port, two exhaust ports and two cylinder ports for connection to an operating valve, the cored pasages in said second block including three L-shaped passages lying between planes parallel to the registering surfaces of said blocks with three legs of the passages parallel longitudinally of said blocks, the other legs terminating normal to a longitudinal edge.

References Cited by the Examiner

UNITED STATES PATENTS

| | | | |
|---|---|---|---|
| 2,871,886 | 2/59 | Obrebski et al. | 138—111 |
| 2,997,068 | 8/61 | Roos | 137—608 XR |
| 3,020,927 | 2/62 | McLaughlin | 137—625.68 |
| 3,025,878 | 3/62 | Hupp | 137—608 XR |
| 3,028,880 | 4/62 | Reitman | 137—625.68 XR |
| 3,092,141 | 6/63 | Stark | 137—608 |

FOREIGN PATENTS 1,071,287   3/54   France.

LAVERNE D. GEIGER, *Primary Examiner.*